United States Patent [19]

Mehlberg

[11] 4,350,766

[45] Sep. 21, 1982

[54] PENTOSE SYRUP PRODUCTION FROM HEMICELLULOSE

[75] Inventor: Robert L. Mehlberg, West Lafayette, Ind.

[73] Assignee: Purdue Research Foundation, West Lafayette, Ind.

[21] Appl. No.: 174,454

[22] Filed: Aug. 1, 1980

[51] Int. Cl.$^3$ .................... C13K 1/02; C12P 7/06
[52] U.S. Cl. ................................ 435/161; 127/37
[58] Field of Search ............................ 127/37; 435/161

[56] References Cited

U.S. PATENT DOCUMENTS

| | | | |
|---|---|---|---|
| 1,851,822 | 3/1932 | Farber | 127/37 |
| 2,450,586 | 10/1948 | Dunning | 127/37 |
| 2,481,263 | 9/1949 | Tsuchiya | 435/161 X |
| 2,734,836 | 2/1956 | Elian | 127/37 |
| 3,579,380 | 5/1971 | Friese | 127/37 |
| 4,025,356 | 5/1977 | Nyman | 127/37 X |
| 4,070,232 | 1/1978 | Funk | 127/37 X |
| 4,226,638 | 10/1980 | Pfeiffer | 127/37 |

OTHER PUBLICATIONS

E. C. Sherrard et al., Ind. and Eng. Chem., 37(1), 5–8 (1945).
R. H. Plow et al., Ind. and Eng. Chem., 37(1), 36–42 (1945).
W. T. Schreiber et al., Ind. and Eng. Chem., 22, 497–501 (1930).
J. W. Dunning et al., Ind. and Eng. Chem., 37(1), 24–29 (1948).
Herman F. J. Wenzl, "The Chemical Technology of Wood", pp. 180–252, Academic Press, New York, 1970.
R. L. Mehlberg, PhD Thesis, "Low Liquid Hydrolysis of Corn Cob Hemicellulose by Hydrochloric Acid", Purdue Univ., pp. 122–131, Aug. 1979.

*Primary Examiner*—Sidney Marantz
*Attorney, Agent, or Firm*—Cushman, Darby & Cushman

[57] ABSTRACT

A method for the production of pentose syrup from hemicellulosic material comprising the separate steps of:
 (a) mixing said hemicellulose material with an acid selected from the group consisting of sulfuric and hydrochloric to obtain a final concentration of from about 1% to 15% at liquid:solid ratios between 0.1 and 4.0 whereby the material is ready for hydrolyzing directly or being stored for an indefinite period of time at ambient temperatures without degradation;
 (b) hydrolyzing the acidified material from step (a) by heating the material to a reaction temperature of from 90° to 120° C. for a period of time sufficient to hydrolyze substantially all of the hemicellulose;
 (c) leaching the hydrolyzed material at a temperature of from about 15° to 100° C. with an aqueous medium by percolating said medium through the hydrolyzed material at a velocity of 0.016 to 0.83 mm/sec; and
 (d) recovering a syrup containing at least 5 percent of pentoses whereby there is obtained a pentose syrup having a low PH and suitable for storage for extended periods of time without microbial degradation. The hydrolysis and leaching steps are carried out in a packed bed reactor. The resulting pentose syrup may be subsequently fermented to produce alcohol.

16 Claims, No Drawings

PENTOSE SYRUP PRODUCTION FROM HEMICELLULOSE

BACKGROUND OF THE INVENTION

The present invention relates to a method by which pentose syrups can be produced in a packed bed reactor directly from hemicellulose material in such a manner that the syrups can be directly utilized for fermentation or alternatively stored without undergoing degradation.

With petroleum resources dwindling throughout the world, efforts are being made to utilize alternative sources of energy. Recently, mixtures of gasoline and alcohol have been touted as but one means of alternate energy savings. In order to provide sufficient gasohol products, an economic means for producing the necessary alcohol is needed. Heretofore, production of such alcohol has been chiefly carried out by the conversion of six-carbon sugars derived mainly from grain products and raw sugar. With the increase in cost of such six-carbon sugar materials, there is a need for alternative economic feedstocks for the production of alcohol. Many of the available hemicellulosic feedstocks which have been regarded as waste products, such as bagasse, remain untapped due to the lack of a viable economic means to convert such hemicellulosic waste materials to useful energy forms such as ethanol.

Early work relating to the acid hydrolysis of cellulosic material concentrated primarily on the production of glucose from cellulose. As described by E. C. Sherrard and F. W. Kressman (*Ind. and Eng. Chem.*, 37, 4 (1945)) such work involved charging batch reactors with wood acidified with 2% to 4% sulfuric acid, heating with steam to 100 to 120 psi for about 30 minutes, and thereafter leaching the sugars from the residue in a diffusion battery. However, as noted by R. H. Plow, et al., *Ind. and Eng. Chem.*, 37, 37 (1945), due to the high temperatures and pressures used, excessive degradation of the pentose sugars results.

It has been reported that pentoses can be produced at lower temperatures and pressures to yield pentoses suitable for production of acetone, furfural or alcohols such as butanol and 2,3 butylene glycol. (See W. T. Schreiber, et al., *Ind. and Eng. Chem.*, 22, 497, (1930); and J. W. Dunning, et al., *Ind. and Eng. Chem.*, 37, 24, (1948)).

One of the major deficiencies of these acid processes is the excess of acid which is consumed, which poses obvious disposal and environmental concerns. In addition, these processes tied together separation with reaction and are not suitable for fermenting pentoses to ethanol.

In the Noguchi-Chisso process ("The Chemical Technology of Wood," Hermann F. J. Wenzel, Academic Press, p. 157–252, 1970; and R. L. Mehlberg, "Low Liquid Hydrolysis of Corncob Hemicellulose by Hydrochloric Acid," Ph. D. Thesis, Purdue University, Aug. 2, 1979) pentoses have been removed by hydrolysis at 100° to 130° C. with between 3% and 5% sulfuric acid or 1% to 15% hydrochloric acid at a liquid:solids ratio between 0.5 and 3.0. It appears that the pentoses are wasted with the acid waste water.

As noted above, many of the available hemicellulosic feedstock materials have been regarded as waste products. However, due to recent advances, such as described by Chen, et al., U.S. Application Ser. No. 100,816, filed Dec. 6, 1979, technology is now available which provides for the fermentation of pentoses into ethanol—a valuable synthetic fuel. With the development of such technology, there is a continuing need to provide a viable economic means for conversion of hemicellulose and synthesis of ethanol.

One problem in the processing of any hemicellulosic material arises from the seasonal nature of the material (e.g., sugarcane bagasse and corn), thus necessitating storage of such material for year round operation. Attendant with the storage problem is the problem occasioned by rapid degradation of hemicellulosic material when exposed to the environment. Even with storage indoors at ambient temperatures, degradation will occur which renders the material less suitable for subsequent treatment in the production of alcohol.

Accordingly, it is the primary object of the present invention to provide a viable economic means by which hemicellulose can be processed in a packed bed reactor to yield a pentose syrup suitable for fermenting in the production of ethanol.

This and other objects will be more apparent from the discussion which follows.

SUMMARY OF THE INVENTION

The present invention generally provides a method for the production of pentose syrup from hemicellulose material which comprises the separate steps of:

(a) hydrolyzing hemicellulose material in the presence of from about 1% to 15% of an acid, selected from sulfuric and hydrochloric acid, at a liquid:-solid ratio between 0.1 and 4.0 by heating said material to a reaction temperature of from 90° to 120° C. for a period of time sufficient to hydrolyze substantially all (i.e. at least 90%) of the hemicellulose; and thereafter (b) subjecting the hydrolyzed material to leaching at a temperature of from about 15° to 100° C. with an aqueous medium by percolating said medium through said hydrolyzed material at a velocity of from 0.016 to 0.83 mm/sec; and (c) recovering a syrup containing at least 5 percent of pentoses, whereby there is obtained a pentose syrup having a low pH and suitable for storage for extended periods of time without microbial degradation, said steps (a) and (b) are carried out in the same reaction vessel which is characterized as a packed bed reactor.

In an alternative embodiment according to the present invention, there is provided a method for the production of pentose syrup from hemicellulose material comprising the separate steps of:

(a) mixing said hemicellulose material with an acid selected from the group consisting of sulfuric and hydrochloric acid to obtain a final concentration of from about 1% to 15% at liquid:solid ratios between 0.1 and 4.0 whereby the material is ready for hydrolyzing directly or being stored for an extended period of time at ambient temperatures without loss of potentially fermentable constituents;

(b) hydrolyzing the acidified material from step (a) by heating the material to a reaction temperature of from 90° to 120° C. for a period of time sufficient to hydrolyze substantially all of the hemicellulose;

(c) leaching the hydrolyzed material at a temperature of from about 15° to 100° C. with an aqueous medium by percolating said medium through the hydrolyzed material at a velocity of 0.016 to 0.83 mm/sec; and (d) recovering a syrup containing at least 5 percent (preferably at least 15 percent) of pentoses whereby there is obtained a pentose syrup having a low pH and suitable for storage for extended periods of time without material degradation, said steps (b) and (c) being carried out in the same reaction vessel which is characterized as a packed bed reactor.

While the present method is applicable to all forms of hemicellulose material, it is particularly suited for the treatment of bagasse, cornstover, wheat straw, rice hulls, cotton seed hulls, sorghum stalks, straw, oat hulls, peanut shells, and mixtures thereof.

In order to provide a means to effectively preserve hemicellulose sugars from microbial degradation, a yet further embodiment of the present invention provides a method for the treatment of hemicellulose to render it suitable for storage and subsequent hydrolysis comprises mixing said hemicellulose material with sulfuric or hydrochloric acid to obtain a final concentration of from about 1% to 15% at liquid:solid ratio between 0.1 and 4.0

DETAILED DESCRIPTION OF THE INVENTION

By mixing of concentrated sulfuric or hydrochloric acid with hemicellulosic material to obtain a final concentration between 1% and 15% at liquid:solid ratios between 0.1 and 4.0, the material is in a form suitable for hydrolysis. The mixing may be facilitated by diluting the acid with water or syrup. Alternatively, the acidified hemicellulose may be stored indefinitely at ambient temperature without microbial degradation of the hemicellulose sugars. It goes without saying that the acid must be added prior to storage. After acid addition, no ensilage is required.

Hydrolysis is performed by heating the acidified bagasse to a relatively low reaction temperature of 90°–100° C. Heating for hydrolysis may be facilitated by the introduction of steam and/or hot air into the acidified material. Hydrolysis for a period of 0.75 to 72 hours (depending on the acid concentration) is sufficient to hydrolyze substantially all, i.e. 90% or greater, of the hemicellulose.

After reaction, the hydrolyzed hemicellulose material may be neutralized by the addition of a base such as ammonium hydroxide or lime if desired. The hydrolyzed material optionally can be partially dried so as to increase the sugar concentration. At the same time, one can recover an important by-product of hemicellulose hydrolysis, namely acetic acid which occurs in yields as high as 5% or more.

Prior to leaching, the hydrolyzed hemicellulose may be compressed to provide uniform liquid flow and further increase bulk density.

High clarity sugar syrups are obtained by leaching the hydrolyzed hemicellulose at a temperature of from about 15° to 100° C. by percolating an aqueous medium through the material at a velocity of from 0.016 to 0.83 mm/sec. The aqueous medium may be water, dilute syrups, waste water, or chemical solutions used for further processing. The use of low velocities and a high-packing density enhance the flow of the aqueous leaching medium through the highly porous residue.

Hydrolysis and leaching are carried out stepwise but not concurrently, in the same reaction vessel, a packed bed reactor. One may also employ a multistage diffusion battery type arrangement to carry out hydrolysis and/or leaching. For example, in a multistage diffusion battery arrangement, leaching is accomplished by percolating the aqueous medium through each successive stage and recovering the medium as pentose syrup product until the concentration of pentose in the product falls below 5%, e.g. to about 4%, at which point the recovered percolate is fed to and percolated through the hydrolyzed material in the next stage. Depending upon the nature of the feedstock such a procedure produces sugar concentrations in excess of 200 g/l, and up to 400 g/l depending upon the moisture content of the material. Removal of water after hydrolysis produces high sugar concentrations above 400 g/l without reversion and low yields normally associated with low moisture hydrolysis.

After leaching, the substantially acid-free residue can be left wet at 70%–85% liquid, mechanically dewatered or dried, depending upon the final use of the residue.

The process may be carried out batchwise or continuously in whole or in part.

The hydrolyzate can be neutralized in a number of ways. Complete or partial neutralization directly after hydrolysis or during leaching will minimize sugar reversion and degradation, as well as corrosion. The residue can also be used as a filter medium for insoluble salts (i.e., $CaSO_4$).

Neutralization of the syrup just prior to fermentation permits low pH storage of the syrup for extended periods with low risk of contamination potentially eliminating the need for syrup sterilization.

The following examples are offered in order to more fully illustrate the invention, but are not to be construed as limiting the scope thereof.

EXAMPLE ONE

Treatment of Bagasse for storage or direct hydrolysis.

Sugarcane bagasse was mixed with sulfuric acid to obtain 2% $H_2SO_4$ on the dry bagasse. Two hundred milliliters of a 200 kg/m³ sulfuric acid solution were sprayed onto 4.54 kg of fresh bagasse at 55% moisture. After two weeks to three months of storage in sealed jars at ambient conditions (25° to 30° C.), no mold growth was visible and no loss in total fermentable sugar was observed. After several weeks of storage, some hydrolysis of the hemicellulose was observed, but no sugars were lost. As a control, untreated bagasse similarly stored exhibited visible mold growth and measurable sugar loss in a few days.

EXAMPLE TWO

Hydrolysis and leaching of bagasse.

Bagasse was treated with 2.5% $H_2SO_4$ in a continuous flow spraying device and stored in a covered pile for 3 months. Four samples of preserved bagasse (0.5 kg) at liquid:solid ratios of 1.0 were packed into a 0.05 m diameter × 0.90 m jacketed column. The bagasse was hydrolyzed at 95° C. for 15 to 18 hours producing 21 kg sugars/100 kg dry bagasse. After hydrolysis, the syrup was recovered by downflow leaching followed by mechanical expression. Leaching was performed at 95° C. at a flow rate of 0.011 l/min. First, 0.30 l of a dilute sugar solution at 22 kg/m³ from a previous column was used as the eluent. Secondly, 0.50 l of press drainage at 11 kg/m³ sugars, from a previous column was used as the eluent. Finally, 0.45 l of water was used as the eluent.

The first 0.30 l of sugars eluting from the column were taken as product averaging 160 kg/mhu 3 of sugars. The next 0.30 l of dilute sugars (22 kg/m$^3$) became the first eluent for the next column. Finally, the column was unloaded and the residual fibers were pressed to 67% moisture in a Carver Model C hydraulic press. The press drainage, averaging 0.50 l at 11 kg/m$^3$ sugars became the second eluent for the next column. Ninety two percent of the sugars were recovered by this process.

EXAMPLE THREE

Sugarcane bagasse treated with 2.5% H$_2$SO$_4$ was stored for 4 months at 25° to 30° C. Nineteen kg of bagasse at a liquid:solid ratio of 1.0 were hydrolyzed at 100° C. for 19 hours in a 120 l reactor. The bagasse was heated by injection of steam in the reactor and maintained at 100° C. in a large oven. Yield was 26% and the final liquid:solid ratio was 1.0.

After hydrolysis, the material was passed through a Sprout Waldron refiner for size reduction. Upon leaching with water at 0.010 l/min at 90° C. in a 0.05 m diameter by 0.90 m column, particles under 18 mesh were found to have 25% greater leaching rates than particles over 2 mesh.

EXAMPLE FOUR

An acidic bagasse hydrolysate produced as described in Example 3, containing about 40 kg/m$^3$ H$_2$SO$_4$, 110 kg/m$^3$ sugars, 15 kg/m$^3$ acetic acid and a small amount of furfural, was partially evaporated at 50° C. All of the furfural was collected overhead after evaporation of 70% of the water, and 72% of the acetic acid was recovered overhead after evaporation of 80% of the water. No measurable loss of sugars and no additional furfural were formed, showing that acetic acid and other valuable volatile products were successfully stripped from the hydrolysate without sugar degradation.

From the foregoing, the advantages of the present process are self evident. The process is particularly suitable for highly selective xylan hydrolysis. Low temperature, low liquid hydrolysis with moderately concentrated acids 0.12 to 3.00 N (0.6% to 15%) produces pentoses with little or no degradation, in contrast to high temperature processes. Through low temperature hydrolysis, (90°14 110° C.) fractionation of the pentoses from cellulose is possible. Cellulose hydrolysis does not occur appreciably. The yields of glucose during hydrolysis are less than 3% of the dry substrate.

The process provides minimum exposure of easily degraded xylose to reaction temperature. In acid percolation or recycle processes, the acidic pentoses may be maintained at reaction temperature several times longer than the solids. In the present process, pentoses are exposed to reaction conditions only as long as the solids.

The present process is energy efficient because of the low temperatures involved and the limited water used in hydrolysis. Heat requirements are less than 300 BTU per pound of dry bagasse.

The low temperatures enable use of low value exhaust steam or flue gases to heat the feedstock. The concentrated syrup produced during reaction will require little energy input for water removal from the syrups.

Because of the small amount of liquid used for hydrolysis, high concentrations of acid can be obtained with only small amounts of acid (1% to 5% H$_2$SO$_4$ on a dry basis). Due to the low acid requirements, usage of chemicals for neutralization (i.e., lime, ammonia) is also low. Since the sugars are washed from the fiber with water, essentially all of the acid is removed with the sugar. This is in contrast to percolation processes which leave large amounts of catalyst on the residue causing increased acid consumption and corrosion problems in residue handling equipment.

Applying the acid at low temperature eliminates the complications of acid diffusion and poor distribution during reaction. By eliminating the mass transfer operations from the reaction, these can be separately optimized. The reaction then can be fully optimized for maximum yield without the constraints imposed by sugar recovery. Sugar recovery can be fully optimized to produce high sugar concentrations without degradation. The hydrolyzed sugars can be neutralized to prevent degradation during drying and leaching.

The low temperature operation is made feasible by use of a small moderately concentrated acid phase. The high acid concentration promotes the hydrolysis rate, but the small amount of liquid reduces the overall consumption. Low temperature operation also facilitates continuous processing because operation at atmospheric pressure is possible. The low temperatures and pressures will enable use of low cost, corrosion resistant organic coatings and plastics as materials of construction. Low pH storage is a significant feature of the invention. The low pH syrup storage greatly reduces the risk of fermentor contamination and eliminates the need for syrup sterilization.

The invention, in its broadest aspects, is not limited to the specific details shown and described, but departures may be made from such details within the scope of the accompanying claims without departing from the principles of the invention. Furthermore, the invention may comprise, consist, or consist essentially, of the hereinbefore recited materials and steps.

What is claimed is:
1. A method for the production of pentose syrup from hemicellulose material which comprises the separate steps of:
   (a) hydrolyzing hemicellulose material in the presence of from about 1% to 15% of an acid, selected from sulfuric and hydrochloric acid, at a liquid:solid ratio between 0.1 and 4.0 by heating said material to a reaction temperature of from 90° to 120° C. for a period of time sufficient to hydrolyze substantially all of the hemicellulose; and thereafter
   (b) subjecting the hydrolyzed material to leaching at a temperature of from about 15° to 100° C. with an aqueous medium by percolating said medium through said hydrolyzed material at a velocity of from 0.016 to 0.83 mm/sec; and
   (c) recovering a syrup containing at least 5 percent of pentoses, whereby there is obtained a pentose syrup having a low pH and suitable for storage for extended periods of time without microbial degradation, said steps (a) and (b) being carried out in the same reaction vessel which is characterized as a packed bed reactor.

2. The method of claim 1 wherein said hemicellulose material is selected from the group consisting of bagasse, corncobs, wheat straw, wood chips, and mixtures thereof.

3. The method of claim 1 wherein said hemicellulose material is bagasse.

4. The method of claim 1 wherein said acid is sulfuric acid and the period of time ranges from about 0.75 to 72 hours.

5. The method according to claim 1 comprising the further steps of:
(d) neutralizing the recovered syrup and thereafter
(e) fermenting the neutralized syrup under conditions such as to convert the pentose to ethanol.

6. The method according to claim 1 wherein any acetic acid which is formed during hydrolysis is separated from the syrup.

7. The method of claim 6 wherein acetic acid is separated prior to recovery of the syrup.

8. The method of claim 1 wherein the recovered syrup contains at least 15 percent of pentoses.

9. The method of claim 1 wherein step (b) is carried out in multiple stages by subjecting the hydrolyzed material to leaching in a multistage diffusion battery.

10. The method of claim 9 wherein the aqueous medium is percolated through a stage and recovered as product until the percentage of pentose in the recovered syrup falls to about 4% at which point the recovered percolate is percolated through hydrolyzed material in the next stage.

11. A method for the production of pentose syrup from hemicellulose material comprising the separate steps of:
(a) mixing said hemicellulose material with an acid selected from the group consisting of sulfuric and hydrochloric to obtain a final concentration of from about 1% to 15% at liquid:solid ratios between 0.1 and 4.0 whereby the material is ready for hydrolyzing directly or being stored for an indefinite period of time at ambient temperatures without degradation;
(b) hydrolyzing the acidified material from step (a) by heating the material to a reaction temperature of from 90° to 120° C. for a period of time sufficient to hydrolyze substantially all of the hemicellulose;
(c) leaching the hydrolyzed material at a temperature of from about 15° to 100° C. with an aqueous medium by percolating said medium through the hydrolyzed material at a velocity of 0.016 to 0.83 mm/sec; and
(d) recovering a syrup containing at least 5 percent of pentose whereby there is obtained a pentose syrup having a low pH and suitable for storage for extended period of time without microbial degradation, said steps (b) and (c) being carried out in the same reaction vessel which is characterized as a packed bed reactor.

12. The method of claim 11 wherein said hemicellulose material is selected from the group consisting of bagasse, corncobs, wheat straw, wood chips, and mixtures thereof.

13. The method of claim 11 wherein said hemicellulose material is bagasse.

14. The method of claim 1 or 11 wherein the aqueous medium is water or dilute syrup.

15. The method of claim 8 wherein said pentoses is xylose.

16. The method of claim 1 or 11 wherein the hydrolyzed material is leached at a temperature of from about 90° to 100° C.